Feb. 1, 1955  F. F. FISHER  2,700,818
AUTOMATIC TOOL FEED MECHANISM
Filed May 22, 1952  2 Sheets-Sheet 1
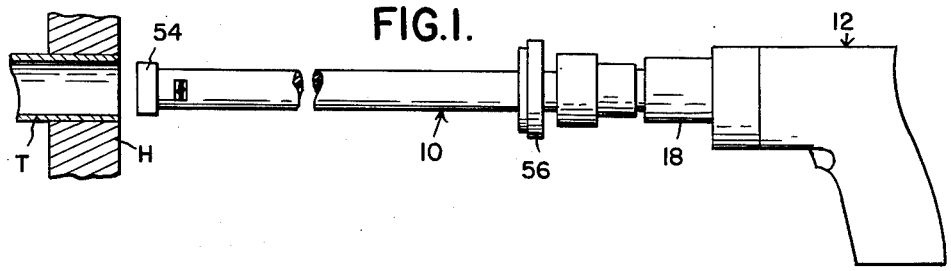
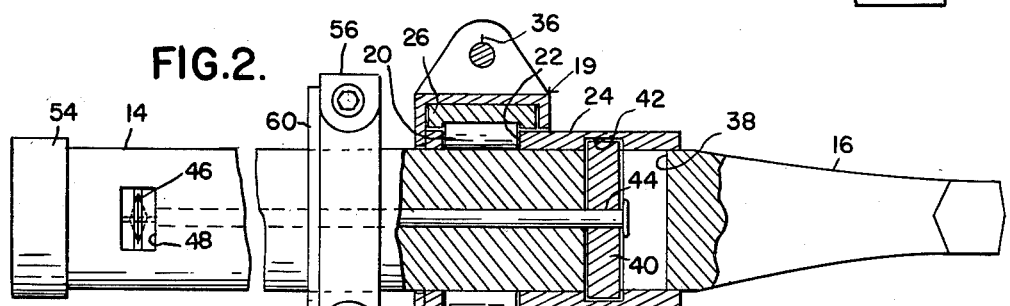
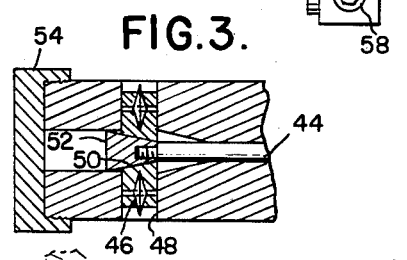
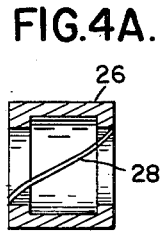
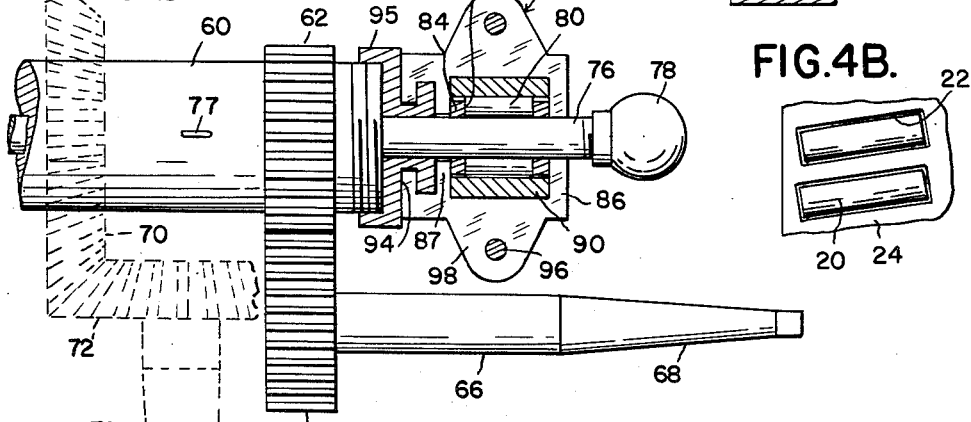
INVENTOR.
FRANK F. FISHER
BY Whittemore,
Hulbert & Belknap
ATTORNEYS Feb. 1, 1955　　　　F. F. FISHER　　　　2,700,818
AUTOMATIC TOOL FEED MECHANISM
Filed May 22, 1952　　　　　　　　　　　　　　　　2 Sheets-Sheet 2
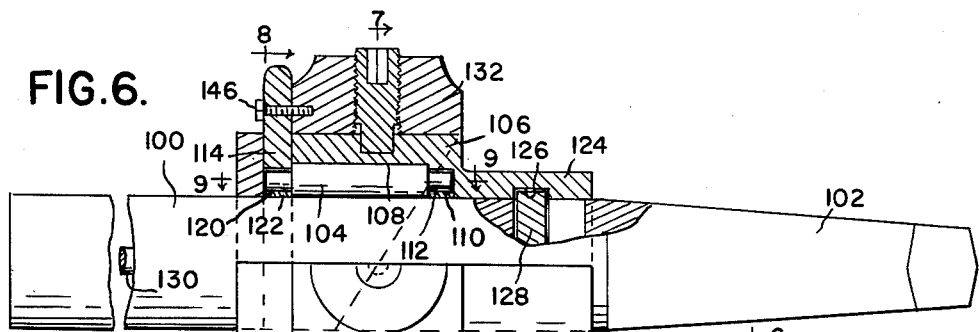
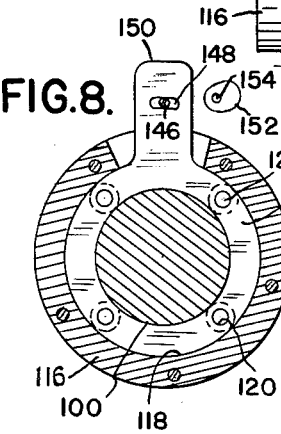
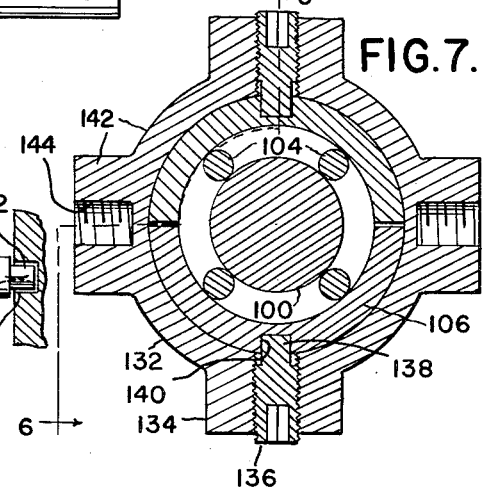
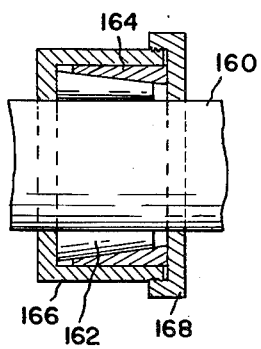
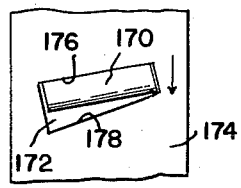
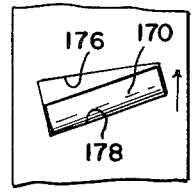
INVENTOR.
FRANK F. FISHER
BY *Whittemore,*
*Hulbert & Belknap*
ATTORNEYS

United States Patent Office 2,700,818
Patented Feb. 1, 1955

2,700,818

AUTOMATIC TOOL FEED MECHANISM

Frank F. Fisher, Detroit, Mich.

Application May 22, 1952, Serial No. 289,370

17 Claims. (Cl. 30—103)

The present invention relates to automatic tool feed mechanism, and more particularly, adjustable automatic tool feed designed for use with internal tube cutters.

It is an object of the present invention to provide tool feed mechanism adapted to have an overload limit which prevents tool feeding under abnormal resistance.

It is a further object of the present invention to provide a tool feed including rollers set at an angle to a cylindrical part in which relative rotation between the part and the set of rollers effects relative longitudinal movement.

It is a further object of the present invention to provide tool feeding apparatus of the character described including means for changing the rate of feed by altering the angle of the feed rollers.

It is a further object of the present invention to provide tool feeding apparatus of the character described in which reverse of the tool feeding action is accomplished by reversing the feed angle of the rollers.

It is a further object of the present invention to provide tool feeding apparatus of the character described including means for accomplishing rapid return of the tool after a cutting stroke by increasing the feed angle of the rollers.

It is a further object of the present invention to provide a tool feeding apparatus characterized by safety features including quick arrest of the tool feeding action under abnormal load conditions, protection against overload and tool breakage, and its applicability to all sizes and types of cutters.

Other objects and features of the invention will become apparent as the description proceeds, especially when taken in conjunction with the accompanying drawings, wherein:

Figure 1 is a side elevation of a tube cutter embodying the present invention, a portion of a tube being shown in section.

Figure 2 is an enlarged side elevation partly in section of the tube cutting mechanism.

Figure 3 is a sectional view through the tool and tool feed mechanism.

Figure 4A is an axial sectional view of the roller cage employed in the tool feeding mechanism shown in Figure 2.

Figure 4B is a fragmentary developed view of a portion of the feed sleeve and the rollers associated therewith.

Figure 5 is a fragmentary side elevational view of tool feed mechanism with parts in section.

Figure 6 is a fragmentary side elevational view of another embodiment of the present invention with parts in section, the section being taken on the line 6—6, Figure 7.

Figure 7 is a section on the line 7—7, Figure 6.

Figure 8 is a sectional view on the line 8—8, Figure 6.

Figure 9 is a section on the line 9—9, Figure 6.

Figure 10 is a detailed sectional view illustrating an alternative method of predetermining pressure between the feed rollers and mandrel.

Figures 11 and 12 are detailed views illustrating a manner of obtaining relative slow feed and fast return.

The present invention provides a simple and effective adjustable automatic tool feed mechanism particularly adapted to operate the mechanism that actuates the cutting tools of internal tube cutters used to cut off or trim boiler tubes or tubes of heat exchangers, or the like. It may safely be used by unskilled labor and is intended to supplant manually operated conventional tool feed mechanism that depends for successful operation on the judgment of a skilled operator. Since this judgment may not always be correct, tube cutters having manually operated tube feeds have in the past had a high percentage of tool breakage and consequent loss of much productive cutting time. This is because the operator cannot see the cutting tools and must therefore depend on "feel". In consequence, much tool breakage is caused by the "hogging" of tools when first starting the cut, and further by overfeeding; and finally at the finish of the cut by letting the cutting tool break through and jam. The new adjustable automatic tool feed eliminates these undesirable features. Once properly adjusted for one tube it will start and continue the cut on each subsequent tube gradually and evenly until the tube is cut through completely. If for any reason during the cutoff operation the resistance to an outward feeding of the cutting tools exceeds the limit as set by adjustment into the mechanism, the outward feeding of the cutting tool ceases automatically. However, as soon as the abnormal resistance is eliminated, outward feeding of the cutting tool resumes again automatically. This safety feature protects the cutting tools against overloads and consequent breakage.

The principle on which the adjustable automatic tool feed operates is a releasable friction drive deriving power and motion from rollers held in close contact with a rotating central mandrel of the tube cutter. By placing these rollers at a definite angle, herein referred to as the feed angle, to the axis of the mandrel, rotation of the rollers around their own axes will cause the rollers to follow a helical path around the periphery of the mandrel, thus acting in a manner similar to a nut turning around a threaded bolt. Therefore, the pitch of the helix and the axial relative movement between the rollers and the mandrel vary directly with the feed angle. Also, all other factors being equal, the power developed by the automatic tool feed varies with the pressure exerted on the mandrel surface by the rollers. In order to actuate the rollers and vary the pressure thereon, the rollers are surrounded by a split roller track or other means capable of exerting and controlling the pressure between the rollers and the mandrel surface. The split roller track in turn is held together and in position by a clamping ring or other means capable of exerting, maintaining, and changing the roller pressure. When the tube cutter is rotated by means of a suitable motor, with pressure on the rollers, stopping rotation of the roller track will force the rollers to roll about their own axes and in consequence of the feed angle, this will produce relative travel between the assembly of rollers and the mandrel in a direction axially of the mandrel and thus furnish the power necessary to actuate the feed mechanism of the tube cutting tools.

With the foregoing general comments in mind reference is now made to Figures 1–4 illustrating an embodiment of the present invention.

In Figure 1 the complete tube cutter is indicated at 10 and is shown as connected to a power unit 12 which is illustrated as in the form of a so-called tap gun. The tap gun 12 includes a motor, a switch, an axially movable spindle, together with means for driving the spindle forwardly or in reverse, or interrupting spindle drive, dependent on the axial position of the spindle. A tap gun of this type is shown in the patent to L. F. Meunier, No. 1,739,980, to which reference is made for details of the tap gun. The tube cutter is designed for effecting an internal cutoff of a tube T, one end of which is secured in a header H.

Referring now more particularly to Figures 2 and 3 the tool feeding mechanism comprises a cutter body or mandrel 14 of generally cylindrical configuration having a tapered end as indicated at 16, or similar means for association with a chuck 18 forming a part of the tap gun or motor drive 12. Associated with the mandrel 14 is a feed unit indicated generally by the reference numeral 19. The feed unit comprises a plurality of cylindrical rollers 20 mounted for rotation in slots or pockets 22 provided in a feed sleeve 24 which is axially movable on the mandrel 14. As best seen in Figure 4B, the pockets 22 are disposed at a small angle with respect to the axis of the sleeve. This angle may be relatively small as between one and five degrees. Surrounding the rollers 20 is a split roller track 26, the track being split diagonally as indicated at 28 to provide for free rolling of the rollers 20 relative thereto. Surrounding the roller track 26 is a feed adjusting clamp 30 preferably formed in two or more arcuate sections having radially extending clamping ears 32 adapted to be urged together by clamping screws 34. Preferably the ears 32 are provided with indicia indicated at 36 adapted to cooperate with a screw driver slot on the feed screws, or the like, to permit accurate setting of the screws so as to predetermine the pressure applied by the clamp 30 to the roller track 26.

The cutter body or mandrel 14 is provided with a transverse slot 38 in which is provided a feed bar 40 the ends of which extend into an annular internal groove 42 on the sleeve 24. The mandrel 14 has a longitudinally extending bore therethrough in which is provided a feed rod 44, one end of the feed rod being connected to the feed bar 40.

At the opposite end of the mandrel 14 there are provided cutting tools 46 radially movable in slots 48 and having camming surfaces 50 cooperable with a wedge type cam 52 carried at the inner end of the feed rod 44, as best seen in Figure 3. The outer end of the mandrel carries a guide or rotary pilot 54 dimensioned to fit within the tube T.

Mounted on the mandrel 14 is a depth gauge 56 secured in desired position thereon by clamping screws 58 and preferably provided with a washer 60 for engaging the outer surface of the header H, or the end of the tube.

With the structure thus far described the cutting operation is effected by inserting the end of the mandrel into the tube T to a depth determined by abutment between the depth gauge 56 and the wall of the header H. At this time operation of the motor is initiated and will then continue to rotate the complete assembly as a unit. However to effect feeding of the tools, the rotation of the feed unit 19 is arrested and this may be accomplished by the operator simply grasping the feed unit 19, or if desired, an extension handle may be provided on the feed unit or a part adapted to rest against a portion of the head. Actually, the force required to prevent rotation of the feed unit 19 is relatively small and it is perfectly satisfactory for the operator to effect feeding of the tools simply by grasping the feed unit 19 in his left hand while supporting the pistol type tap gun or other motor in his right hand. Due to the angularity of the rollers 20 with respect to the cylindrical surface of the mandrel 14, a relative axial feed between the mandrel and the feed unit is developed. When the tap gun is employed, if pressure is applied by the operator to retain the depth gauge against the surface of the header the feed unit will be fed to the right as seen in Figure 2, thus drawing the feed rod 44 to the right and moving the tube cutters 46 radially outwardly in cutting relation to the tube. It will be appreciated that the axial forces developed are applied first to the rollers and thence through the ends of the rollers to the feed sleeve which in turn transmits the axial force through the feed bar 40 to the feed rod.

The maximum axial force which may be developed by the mechanism depends upon the pressure which is applied to the split roller track 26 by the feed adjusting clamp 30. If a relatively light pressure is developed, the axial forces developed will be relatively small and the rollers will slip if excessive resistance is encountered by the cutters 46. Moreover, while the rollers are rolling in true feeding relation with respect to the mandrel a uniform constant rate of feed is applied to the cutters 46. If excessive resistance to feed of the cutters is developed, the cutters simply cease moving outwardly until the resistance to feed is overcome. Moreover, the present mechanism produces uniform feed of the cutters so that there is no tendency for the cutters to hog at the beginning or to break through during the final stages of the cutting and thus to jam and break the cutters. Instead, the cutters continue a smooth uniform outward feed until the tube is completely severed.

With the mechanism thus far described, in order to retract the cutters to permit withdrawal of the tool from the tube it is necessary to reverse the motor or driving spindle which will reverse the direction of axial feed of the feed unit 19 and thus will retract the cutters 46. It will be understood that the specific cutters disclosed herein are merely exemplary and that details of the cutters form no part of the persent invention. However, it may be noted that the cutter body 46 may include resilient means effective to retract the cutters upon movement of the wedge shaped cam 52 to the left, as seen in Figure 3, thus permitting withdrawal of the cutter head from the tube.

Referring now to Figure 5 there is illustrated a second embodiment of the present invention. In this case the cutter body 60 is adapted to be driven in rotation by a gear 62 carried thereby, meshing with a gear 64 carried by a shaft 66 including a tapered end 68 adapted to be received within a suitable driving chuck connected to a motor. Alternatively, the mandrel 60 will be driven from an offset motor through the medium of bevel gears indicated in dotted lines at 70 and 72, the latter being connected to a tapered shaft end 74 for connection to a suitable motor. In this case the mandrel 60 includes a bore extending longitudinally thereof which receives a cylindrical feed rod 76, the left hand end of which may be connected to any suitable type of tube cut-off tools. The feed rod 76 is longitudinally movable relative to the mandrel 60 but is retained therein against rotation, means for preventing relative rotation between the mandrel and feed rod being diagrammatically illustrated as the key 77, or other means. As illustrated in Figure 5, the right hand end of the feed rod 76 is provided with an enlargement 78 which limits movement of the rod 76 to the left relative to the mandrel. Disposed around the feed rod 76 are a plurality of rollers 80, these rollers being disposed in angular relationship as previously described, and retained in such angular relationship by slots 82 formed in a roller cage 84. The cage 84 is retained in position by flanges 86, 87 of a two-piece feed adjusting clamp 88, which is adapted to apply pressure to a split roller track 90 generally similar to the roller track 26 illustrated in Figure 4A. The clamp 88 includes a radially inwardly projecting flange received in an annular groove 94 in a connector member 95 threaded or otherwise secured to the end of the mandrel 60. The pressure between the rollers 80 and the feed rod 76 is determined by adjustment of clamping screws 96 extending through ears 98 at the ends of arcuate sections of the feed adjusting clamp 88. This predetermines the axial force which will be developed by the feeding mechanism and in the event of excess resistance to axial feed, the rollers 80 will slip relative to the feed rod 76.

Referring now to Figures 6–8 there is illustrated another embodiment of the present invention. In these figures the cutter body or mandrel is illustrated at 100 and includes a tapered or straight end 102 adapted to be received in a driving chuck. Angularly disposed feed rollers 104 are provided in contact with the outer cylindrical surface of the mandrel 100. The rollers 104 in the present embodiment of the invention are angularly and adjustable and reversible as to feed angle so that the mechanism may if desired be employed with a non-reversible motor. A split roller track 106 is provided having an inner cylindrical surface 108 adapted to bear against the rollers 104 and to press them with a predetermined pressure against the mandrel 100. One end of the roller track 106 is provided with a plurality of pockets 110 adapted to receive reduced ends 112 of the rollers 104. The pockets 110 are slightly larger than the reduced ends 112 so that the rollers may move angularly with respect to the split roller track 106. The roller track 106 is also provided with an angularly adjustable control ring 114, this control ring being retained in a recess 118 machined into one end of a cap 116. The control ring 114 is provided with a plurality of openings 120 adapted to receive reduced ends 122 of the rollers 104. Again, the openings 120 are enlarged with respect to the reduced ends 122 so as to permit relative angular movement between the control ring 114 and the rollers 104.

The split roller track 106 includes a sleeve portion 124 provided with an internal annular groove 126 which receives a feed bar 128 which is connected to a feed rod 130 in any suitable manner, as for example in the same way as the feed rod 44 is connected to the feed bar 40 in Figure 2.

Surrounding the roller track portion of the split roller track 106 is a containing body 132 having a pair of diametrically opposed radially projecting ears 134 which are tapped to receive pressure adjusting screws 136. The pressure adjusting screws have reduced ends 138 received in suitably formed recesses 140 provided in the split roller track 106 and in this manner properly locates and positions all parts of the feed assembly. As will be evident, adjustment of the screws 136 varies the pressure exerted on the rollers 104 between the cylindrical surface of the mandrel 100 and the cylindrical inner surface of the split roller track. Circular markings or other indicia (not shown) assist in attaining or regaining the proper roller pressure.

Clamping body 132 is in addition provided with a second pair of diametrically opposed ears 142 which are tapped as indicated at 144 for the reception of a suitable extension handle (not shown).

Stop means are provided for limiting the angular movement of the control ring 114 relative to the split roller track 106. One form of such adjustment limiting means is indicated as a screw 146 extending through an elongated slot 148 provided in a handle 150 projecting radially from the control ring 114. A second type of adjustment limiting means is indicated in Figure 8 as an eccentric abutment 152 mounted for angular adjustment about a clamping screw 154. As will be apparent, loosening of the clamping screw 154 and rotation of the eccentric abutment 152 will provide for an adjustment of the position in which the control handle 150 may be moved in a clockwise direction. A similar abutment may be provided to the left of the control handle 150 so as to provide two predetermined positions of the control ring into which the ring may be moved by moving it its full extent into engagement with one or the other of the abutments. From the foregoing it will be apparent that advance or retraction of the feed rod 130 may be under the control of the operator simply by shifting the control handle 150 between its limiting positions. Thus, for example the apparatus illustrated in Figure 6 may if desired be used with a uni-directional motor, and the adjustable abutments controlling the limiting positions of the control ring may be such as to provide for a relative slow feed in one direction when the control handle is in one limiting position, and a relatively rapid movement of the control rod in the opposite direction when the control handle is in its other limiting position. Alternatively, if the apparatus illustrated in Figure 6 is employed with reversible driving means such for example as of the type illustrated in Figure 1, movement of the control handle 150 between limiting positions may have the effect of controlling the rate of axial movement of the control rod without reversing its direction. Thus, the control handle will be set in one limiting position during the cutting operation in which case a relatively slow axial movement of the control rod results. For retraction, the control handle will be forced to its other extreme position and the motor reversed, which will have the effect of producing a relatively rapid return of the control rod 130. In Figure 9 the limiting positions of the axes of the rollers 104 are diagrammatically shown at 104a and 104b.

Referring now to Figure 10 there is illustrated a modified arrangement of controlling the pressure between the rollers and the cylindrical member with which they co-operate. In this case the cylindrical member is illustrated at 160 and has associated therewith a plurality of tapered rollers 162. Associated with the tapered rollers 162 is a correspondingly tapered roller track member 164 which is received within a cup-like part 166. The cup-like part 166 is provided with a screw cover 168 and tightening of the cover on the cup will force the tapered roller track 164 inwardly, thus increasing the pressure between the rollers 162 and the cylindrical surface of the body 160. In this case means will of course be provided for retaining the rollers in desired angular relationship to the axis of the body 160. This means may take the form of a pocketed sleeve intermediate the roller track 164 and the body 160, or the roller track 164 may itself be provided with angularly disposed pockets which receive the rollers 162.

In Figures 11 and 12 there is illustrated a modification of the present invention in which the rollers 170 are received in pockets or openings 172 provided in a sleeve 174 which may be otherwise identical with the sleeve 24 illustrated in Figure 2. In this case the pockets or openings 172 are provided with roller engaging side walls 176 and 178 which extend at an angle with respect to each other. Thus, when the sleeve 174 is moving in the direction of the arrow shown in Figure 11, the rollers will be forced against the surface 176 and will assume an angularity with respect to the axis of the cylindrical surface of the mandrel determined by the angularity of the wall 176. However, when the direction of relative rotation is reversed, as indicated by the arrow in Figure 12, the rollers 170 will move across the opening or pocket 172 into engagement with the wall 178 and will align themselves thereto, thus assuming a different angular position with respect to the axis of the rotating mandrel. This arrangement is useful where the apparatus is employed with a reversible motor and provides for an automatic variation in speed depending upon the direction of relative rotation. Thus, during the cutting operation the direction of rotation will be as indicated in Figure 11, at which time the rollers 170 will be at a small angle with respect to the axis of the mandrel and will accordingly produce a relatively slow axial displacement. Upon reversal however, as illustrated in Figure 12, the rollers assume a larger angular displacement with respect to the axis of the mandrel and accordingly retraction of the cutting tools will be at a substantially increased rate. Thus, employing a reversible constant speed motor it is possible automatically to produce a relatively slow controlled cutting operation and a relatively rapid return of the cutters to inoperative position.

In all of the embodiments of the invention the essential feature is the cooperation between a cylindrical body and a plurality of elongated rollers of circular cross-section disposed at an angle with respect to the axis of the cylindrical body. The rollers are mounted in cage means which simultaneously hold the rollers in predetermined angular relationship and at the same time apply a predetermined controllable pressure between the rollers and the cylindrical surface. The axial displacement between the rollers and the cylindrical surface is employed to effect axial displacement between the rotating mandrel and a feed rod associated therewith. In the embodiments illustrated in Figures 1–4 and Figures 6–9, the rollers are associated directly with a cylindrical surface on the mandrel. In the embodiment of the invention illustrated in Figure 5 the rollers are associated directly with the feed rod. In either case however, the action is the same and results in axial displacement between the feed rod and the rotating mandrel.

The drawings and the foregoing specification constitute a description of the improved automatic tool feed mechanism in such full, clear, concise and exact terms as to enable any person skilled in the art to practice the invention, the scope of which is indicated by the appended claims.

What I claim as my invention is:

1. In tool feed mechanism of the character described, a body having a cylindrical surface, a sleeve surrounding said surface and having a plurality of slots therein disposed to extend at a small angle to the axis of the cylindrical surface, elongated rollers of circular cross-section disposed in said slots and engaging said cylindrical surface, a split roller track surrounding said sleeve and engageable with said rollers, an adjustable clamping ring surrounding said roller track and pressing said track against said rollers, and means for effecting rotation of said body while said sleeve is held against rotation.

2. Structure as defined in claim 1 in which said body comprises a rotary mandrel, and a feed rod connected at one end to said sleeve and extending longitudinally of said mandrel.

3. Structure as defined in claim 1 in which said body comprises a feed rod, a rotary mandrel on which said sleeve is rotatably mounted, and means mounting said rod on said mandrel for rotation therewith and axial movement relative thereto.

4. Structure as defined in claim 1 comprising means operable automatically in response to reversal of the direction of relative rotation between said sleeve and body for changing the angularity of said rollers relative to the axis of said cylindrical surface.

5. Structure as defined in claim 1 comprising means for adjusting the angularity of said rollers in either direction from a neutral position parallel to the axis of said surface.

6. In tool feed mechanism of the class described, a body having a cylindrical surface and a roller cage sleeve surrounding said surface, said sleeve having elongated roller receiving openings opposite sides of which are inclined to each other, rollers in said openings engaging said cylindrical surface, a roller track surrounding said sleeve and engaging said rollers, means for selectively effecting rotation of said body in both directions while said sleeve is held against rotation, said rollers being loosely received in said openings and adapted to engage a side of said openings to assume an angularity relative to the axis of said surface depending on the direction of relative rotation.

7. In tool feed mechanism of the class described, a body having a cylindrical surface, a plurality of elongated rollers engaging said surface, feed means surrounding said body and relatively rotatable with respect thereto and including means positioning said rollers at an angle to the axis of said surface and pressing said rollers against said surface, said feed means including pairs of angularly disposed positioning surfaces one or the other of which is engageable with a roller dependent upon the direction of relative rotation between said body and said feed means, and means for rotating said body while said feed means is held against rotation.

8. Axial feed mechanism of the class described comprising an elongated body having a cylindrical surface thereon, an annular roller track member surrounding said cylindrical surface and mounted on said body for relative rotation with respect thereto, said member having an internal cylindrical surface spaced from the cylindrical surface of said body, said annular member having a circumferentially spaced plurality of pockets at one end of the space between said cylindrical surfaces, a control ring on said annular member closing the other end of said space, a circumferentially spaced series of pockets in the portion of said control ring closing the said other end of said space, rollers in said space having end portions received in said pockets, said ring being angularly adjustable about the axis of said cylindrical surfaces to adjust the angularity of said rollers relative to the axis of said cylindrical surfaces.

9. Structure as defined in claim 8 in which said annular member is split, a clamp surrounding said annular member, and means on said clamp for compressing said annular member to control the pressure between said rollers and said cylindrical surfaces.

10. Structure as defined in claim 8, said control ring having an arm extending therefrom for manual adjustment of said ring.

11. Structure as defined in claim 10, and stop means for limiting rotation of said ring.

12. Structure as defined in claim 11 in which said stop means is adjustable to provide for a predetermined feed ratio when said ring is moved to limiting positions.

13. Tool feeding mechanism for tube working apparatus of the type comprising a mandrel adapted to be driven in rotation and having radially movable tools and a tool feed rod movable axially of said mandrel to effect radial feed of the tools, said mechanism comprising an annular feed unit mounted on the mandrel for rotation relative thereto and adapted to be held against rotation by the operator, said feed unit having an internal bearing surface of circular cross-section, means providing an external bearing surface of circular cross-section within said feed unit, a series of elongated rollers of circular cross-section intermediate and in contact with said bearing surfaces, adjustable means for pressing said feed unit radially inwardly to vary the pressure between said rollers and bearing surfaces, means supporting said rollers with their axes at a small angle to the axes of said bearing surfaces, and means responsive to relative axial movement between said feed unit and said means providing an external bearing surface to produce movement of said rod axially of said mandrel.

14. Tool feeding mechanism for tube working apparatus of the type comprising a mandrel adapted to be driven in rotation and having radially movable tools and a tool feed rod movable axially of said mandrel to effect radial feed of the tools, said mechanism comprising an annular feed unit mounted on the mandrel for rotation and axial movement relative thereto and adapted to be held against rotation by the operator, said feed unit having an internal bearing surface of circular cross-section, an external bearing surface of circular cross-section on said mandrel within said feed unit, a series of elongated rollers of circular cross-section intermediate and in contact with said bearing surfaces, adjustable means for pressing said feed unit radially inwardly to vary the pressure between said rollers and bearing surfaces, means supporting said rollers with their axes at a small angle to the axes of said bearing surfaces, and means connecting said feed unit to said rod to produce axial feed of said rod relative to said mandrel upon axial movement of said feed unit relative to said mandrel.

15. Tool feeding mechanism for tube working apparatus of the type comprising a mandrel adapted to be driven in rotation and having radially movable tools and a tool feed rod movable axially of said mandrel to effect radial feed of the tools, said mechanism comprising an annular feed unit mounted on the mandrel for rotation relative thereto and adapted to be held against rotation by the operator, means preventing axial movement of said feed unit on said mandrel, said feed unit having an internal bearing surface of circular cross-section, said rod having an external bearing surface of circular cross-section within said feed unit, a series of elongated rollers of circular cross-section intermediate and in contact with said bearing surfaces, adjustable means for pressing said feed unit radially inwardly to vary the pressure between said rollers and bearing surfaces, means supporting said rollers with their axes at a small angle to the axes of said bearing surfaces whereby rotation of said mandrel while holding said feed unit against rotation feeds said rod axially of said mandrel, and means responsive to relative axial movement between said feed unit and said means providing an external bearing surface to produce movement of said rod axially of said mandrel.

16. A tube cutter comprising a hollow rotary mandrel, a sleeve surrounding said mandrel and axially movable and relatively rotatable thereon, inclined rollers engaged directly with and between said sleeve and mandrel, cutting tools adjacent an end of said mandrel, a feed rod extending axially of said mandrel and connected to said sleeve, means for driving said mandrel in rotation, said sleeve being adapted to be manually held against rotation to effect feeding of said tools.

17. A tube cutter as defined in claim 16 comprising means for shifting the direction of inclination of said rollers to reverse the direction of relative axial movement between said mandrel and rod.

References Cited in the file of this patent

UNITED STATES PATENTS

| | | |
|---|---|---|
| 482,496 | Coppage | Sept. 13, 1892 |
| 2,152,518 | Wolff | Mar. 28, 1939 |
| 2,204,638 | Weathers | June 18, 1940 |
| 2,215,678 | Weathers | Sept. 24, 1940 |